UNITED STATES PATENT OFFICE.

JACOB REESE, OF PHILADELPHIA, PENNSYLVANIA.

PHOSPHATE AND METHOD OF MAKING SAME.

SPECIFICATION forming part of Letters Patent No. 714,331, dated November 25, 1902.

Application filed March 12, 1902. Serial No. 97,933. (No specimens.)

*To all whom it may concern:*

Be it known that I, JACOB REESE, a citizen of the United States, residing at Philadelphia, in the county of Philadelphia and State of Pennsylvania, have invented a certain new and useful Improvement in Phosphates and Methods of Making the Same, of which the following is a full, clear, and exact description.

The object of this invention is to produce a substance suitable for plant-fertilization and for defecation and other purposes.

In the United States large quantities of slag result from the working of the basic open-hearth steel process, and this slag while rich in lime is poor in phosphoric acid relatively to the slag produced by the basic Bessemer process. The open-hearth slag is at present largely, if not wholly, a waste product; but I purpose to use it for the manufacture of a plant-fertilizer and also as a defecator by enriching it with phosphoric material, such as the natural phosphate rock found in Tennessee, Florida, and other parts of the United States.

Analysis shows that the basic Bessemer slag contains in one hundred parts about fifty-one parts of lime and nineteen or twenty parts of phosphoric acid, while the basic open-hearth slag contains in one hundred parts about fifty of lime and six or seven of phosphoric acid and is relatively low in silica. The basic Bessemer slag is not available in the United States, because that process is not now practiced here to any extent, while the basic open-hearth process is largely practiced here, and its slag exists in large quantities. I have discovered that this waste slag may be utilized as stated by mixing with it in various proportions mineral calcic phosphate free from or low in silica and fusing the mixture in a cupola or other suitable furnace in the presence of an oxidizing-flame, the product being ground or pulverized after cooling in order to fit it for use.

I have used various proportions of slag and mineral in forming the mixture ranging from ten per cent. of slag and ninety per cent. of mineral to seventy per cent. of slag and thirty per cent. of mineral, and analysis shows that the proportions of lime and phosphoric matter in the product vary from fifty-five plus of the former and twenty-seven plus of the latter in the first instance to fifty-two plus of the former and thirteen plus of the latter in the last instance, so that it is possible to obtain a product in which the proportions of lime and phosphoric matter may be adjusted as required for the specific purposes of the product. The slag contains lime, silica, iron oxid, manganese oxid, and phosphoric acid.

In the practice of this invention I admix such quantity of mineral calcic phosphate as desirable with the basic open-hearth slag and subject the mixture to a fusing temperature in a cupola or other furnace until the mass is fluid enough to run from the furnace freely, when it may be run into slag-cars and taken to the dump and emptied in a mass, so that it may become annealed by its own heat. When fused and allowed to cool in this manner, the slag becomes porous, while the phosphorus is made more available as plant-food.

Care should be taken that the gases of the furnace should be largely carbonic acid, for when the gases are of the same quality as those in a blast-furnace the oxid of iron and oxid of manganese would be reduced and carry the phosphorus down as a phosphide of iron instead of a phosphate.

I do not limit this invention to the exact mixtures specified, but name them to show that in the large scope of the invention a basic calcareous phosphatic slag is produced under the varying mixtures.

Every element contained in the basic slag composed as herein specified is available plant-food, and when it is finely pulverized and applied to the land it will prove to be an excellent fertilizer. The basic slag so treated may be used to advantage instead of bones in purifying sugar, as it is absolutely free from vegetable and animal matter.

While it is very desirable that the mixture of basic open-hearth slag and mineral phosphate should be fused together, still the mineral phosphate may be fused and then admixed with the basic open-hearth slag, or the mineral and the metallic oxids may be admixed without furnace heat applied to the mixture itself as such and the resulting contents show a slag high in phosphoric acid; but while it is desirable to fuse the mass I do not limit myself to furnace heat, as my invention is the utilization of basic open-hearth slags by increasing the percentage of phosphoric acid in them by incorporating therewith the phosphoric acid of mineral phosphates.

What I claim as my invention, and desire to secure by Letters Patent, is—

1. The method of making a compound of calcic phosphates, which consists in intimately mixing basic open-hearth slag and fused mineral calcic phosphate both low in silica.

2. The method of making calcic phosphates, which consists in mixing, by aid of fusion, basic open-hearth slag and mineral calcic phosphate both free from or low in silica.

3. The method of making calcic phosphates, which consists in mixing, by aid of fusion, basic open-hearth slag and mineral calcic phosphate, both low in silica, in presence of an oxidizing-flame.

4. The method of making calcic phosphates, which consists in mixing, by aid of fusion, basic open-hearth slag and mineral calcic phosphate, both low in silica, in presence of an oxidizing-flame, and pulverizing the product.

5. The method of making calcic phosphates, which consists in mixing, by aid of fusion, basic open-hearth slag and mineral calcic phosphate, both low in silica, in presence of an oxidizing-flame, annealing and then grinding the product.

6. A calcic phosphate compound, composed of intimately-mixed basic open-hearth slag and mineral calcic phosphate both low in silica.

7. A calcic phosphate compound, composed of a ground mixture of basic open-hearth slag and mineral calcic phosphate both low in silica.

In testimony whereof I have hereunto set my hand this 11th day of March, A. D. 1902.

JACOB REESE.

Witnesses:
 JULIUS B. PRICE, Jr.,
 PHILIP P. CHASE.